No. 867,673. PATENTED OCT. 8, 1907.
A. C. PEARCE.
VENTING TOOL.
APPLICATION FILED MAY 14, 1906.
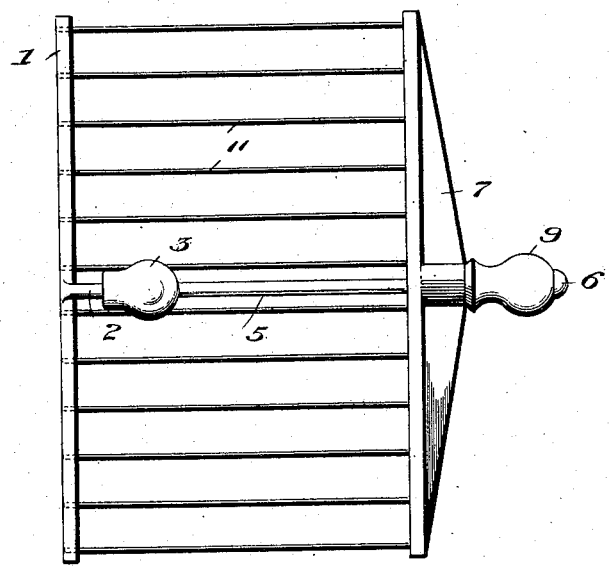
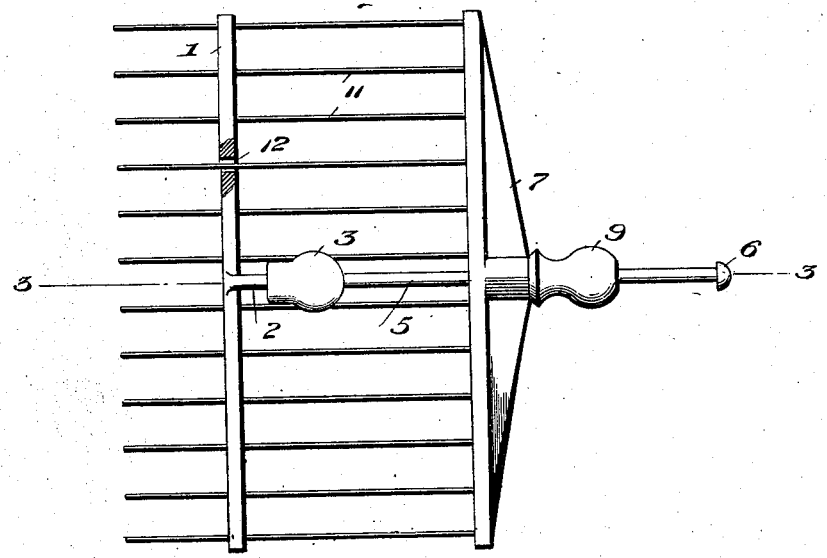

UNITED STATES PATENT OFFICE.

ALEXANDER C. PEARCE, OF BATON ROUGE, LOUISIANA.

VENTING-TOOL.

No. 867,673.  Specification of Letters Patent.  Patented Oct. 8, 1907.

Application filed May 14, 1906. Serial No. 316,778.

*To all whom it may concern:*

Be it known that I, ALEXANDER C. PEARCE, a citizen of the United States, residing at Baton Rouge, parish of East Baton Rouge, and State of Louisiana, have invented certain new and useful Improvements in Venting-Tools for the Sand Cores of Molds, of which the following is a specification.

This invention is a venting tool for the sand cores of molds.

My object is the provision of a hand operable tool of extremely simple, light, strong and durable construction which will be inexpensive to manufacture and adapted to form a multiplicity or plurality of vents in the sand cores of molds, particularly those that form the opening in a grate bar mold, the invention being intended to provide a means whereby the venting operation may be rapidly and easily accomplished to insure the free passage of the escaping gases while the molten iron is being cast in the mold.

Having the foregoing object in view, the invention contemplates the provision of a guide bar or member having a handle, and a slidable member having tines or venting rods or wires guided by the guide bar and adapted for retraction through or projection from said guide bar by the manipulation of a handle, the guide bar being intended to be placed over the core and the movable member operated to project the tines or venting wires into the core, as fully set forth hereinafter.

In the accompanying drawings: Figure 1 is a face view of the invention showing the venting tines or wires completely retracted; Fig. 2, a similar view showing the venting tines or wires projected; and Fig. 3, a section on line 3—3 of Fig. 2.

In carrying out the invention there is provided a flat, narrow guide bar 1 to which is secured, or formed integral, the inclined shank 2 having handle 3. Secured, preferably by riveting at 4, is a guide rod 5 having a button 6 at its upper end and extending at right angles to the guide bar 1.

The numeral 7 designates a beam or bar, through which the guide rod 5 loosely passes at 8, permitting reciprocation of said beam or bar 7 between the guide bar 1 and button 6. A handle 9 is secured to the beam 7 at 10 and the rod 5 passes loosely through handle 9, said handle forming a convenient means for manipulating the beam or bar 7.

Secured to the beam or bar 7 are a plurality of venting tines or wires 11 which lie in the same plane in parallel arrangement to each other and pass through openings 12 in the guide bar 1.

In using the tool, the operator grasps the handle 3 in one hand and places the guide bar 1 over the sand core of the mold which it is desired to vent, the other hand previously grasping the handle 9 and retracting the beam 7 and venting tines or wires 11 to the position shown in Fig. 1. Having thus positioned the tool for operation, the user presses down on the handle 9 and thereby projects the venting tines 11 through the openings 12 and into the sand core, thus causing a multiplicity of venting holes to be made at one stroke in the sand core. This movement is limited by the engagement of bars 7 and 12.

Having thus described my invention, what I claim as new and desire to secure by Letters Patent, is:—

In a portable hand venting tool for sand cores for molds, the combination with a guide bar having a plurality of transverse openings, of a handle extending at an angle thereto from the central part thereof, a guide rod connected to the guide bar at the central part thereof and extending at right-angles thereto and provided with a button at its outer end portion, a bar or beam disposed parallel to the guide bar and slidable at its central portion on the guide rod, a handle connected to the slidable bar and perforated to receive the guide rod, and venting tines or teeth secured to the slidable bar and slidable through openings in the guide bar.

In testimony whereof, I hereunto affix my signature in presence of two witnesses.

ALEXANDER C. PEARCE.

Witnesses:
M. CHAMBERS,
R. FARNE.